April 13, 1965 P. D. WENZEL 3,177,976
ADJUSTABLE STOP FOR HYDRAULIC CYLINDER
Filed Dec. 18, 1963
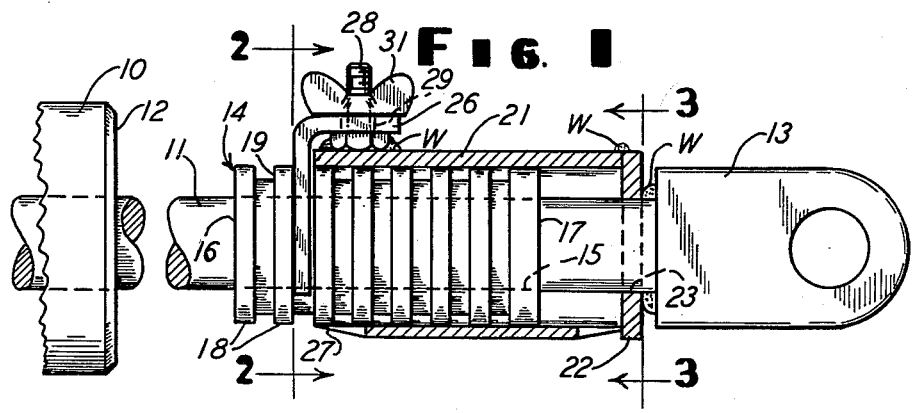
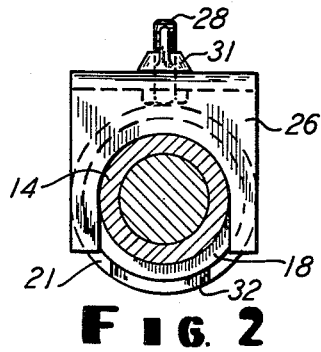
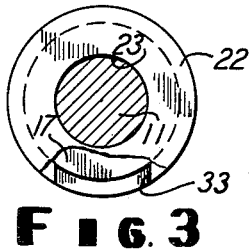
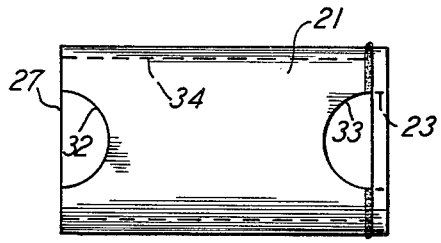
INVENTOR:
PHILIP D. WENZEL
BY: *Arthur J. Hanemann*
ATTORNEY US United States Patent Office 3,177,976
Patented Apr. 13, 1965

3,177,976
ADJUSTABLE STOP FOR HYDRAULIC
CYLINDER
Philip D. Wenzel, Rockford, Ill., assignor to J. I. Case
Company, Racine, Wis., a corporation of Wisconsin
Filed Dec. 18, 1963, Ser. No. 331,468
7 Claims. (Cl. 188—67)

This invention relates to an adjustable stop for use on a movable member and for limiting the extent of movement of the member in one direction.

This invention has particular application in the provision of an adjustable stop for the rod of a hydraulic cylinder, and accordingly it will be shown and described in that environment. In this art, it will therefore be understood that it is desirable to limit the position to which the rod can be retracted, and many attempts have been made to provide means which will be a satisfactory answer to the problem. In these previous approaches to answering the problem, collars of a removable nature have been employed over the cylinder rod such that when the rod is retracted the collars will abut the enlarged end of the rod and also abut the hydraulic cylinder to stop the retractable movement of the rod. Of course numerous collars must be provided in order for the desired setting to be achieved, and even then the desirable increments of adjustment are not reasonably possible without utilizing a varied supply of collars. Also, attachments to the cylinder and the rod have been employed with means for adjustably positioning the attachments by extending them away from the cylinder and into abutting position with the retractable rod, but these too require extensive modification and addition to the basic hydraulic cylinder and rod. Also, rods with threaded sections have been employed for disposing the rod in the selected extended or retracted position relative to the cylinder so that a stop might be employed along the threaded section for the purpose mentioned. Of course this requires a machined part with threads and carefully fitted parts which must be manufactured, assembled, and maintained in order to have them operate in the delicate manner of threaded connections and of course to have them sustain axial loads on the threads.

Accordingly, it is a general object of this invention to provide an adjustable stop which overcomes the heretofore mentioned problems encountered by the prior art devices.

A more specific object of this invention is to provide an adjustable stop for mounting onto a movable member and to have the stop simple or inexpensive in its manufacture and adjustable feature, but of course to have it sufficiently sturdy to withstand large compressive forces.

Still another specific and important object of this invention is to provide an adjustable stop which can withstand compressive forces without buckling.

Still a further object of this invention is to provide an adjustable stop which is made of only a few parts but nevertheless has provision for many increments of adjustable settings, with each setting being accurately retained in its set position without working itself out of the set position.

Still a further object of this invention is to provide an adjustable stop for a hydraulic cylinder or the like which is subjected to heavy duty work and wherein the requirements are such that dirt which may reach the stop will not affect the function of the stop, and the dirt will be passed-off and easily removed from the stop.

Still a further object of this invention is to provide an adjustable stop which does not require a supply of parts for attaining the desired position in setting the stop, and which, in fact, has only a few parts which are all in operation at all times so that no parts need be carried for the purpose of achieving other set positions.

Other objects and advantages become apparent upon reading the following description in light of the accompanying drawing, wherein:

FIG. 1 is a side elevational view of a preferred embodiment of this invention shown partly sectioned and on a fragment of a hydraulic cylinder.

FIG. 2 is a sectional view taken along the line 2—2 of FIG. 1.

FIG. 3 is a sectional view taken along the line 3—3 of FIG. 1 and has a part thereof broken away.

FIG. 4 is a bottom plan view of a part shown in FIG. 1.

It should be mentioned that the stop is useful to limit retraction of a hydraulic cylinder used on machines, plows, and the like.

The drawings show the hydraulic cylinder 10 having its usual rod 11 extending from the cylinder end plate 12, and the usual clevis or enlargement 13 is shown on the extended end of the rod 11, and is secured thereto by a weldment indicated W.

The adjustable stop of this invention is shown to consist of a spool 14 of a generally tubular shape having an internal cylindrical opening 15 extending through the length thereof for slidable and snug mounting on the cylindrical rod 11. The member 14 thus extends from one end 16 to another end 17, and it also has the rings or projections 18 extending around the member and in alternate positions with the grooves 19. Thus the ring 18 are of course spaced apart along the member 14 and provide the increments of adjustment of the entire stop in a manner described later.

A sleeve or second piece 21 is snugly and telescopically slidably disposed over the piece 14, and it is actually engaged with the circumference of the rings 18. The sleeve 21 has an end plate 22 secured thereto by welding indicated W, and the plate 22 has a central opening 23 which is snugly slidably mounted on the cylindrical rod 11, as best shown in FIG. 3.

At this point it will be appreciated that the pieces 14 and 21 are both piloted on the rod 11, and the pieces are arranged such that when they are telescopically extended, such as in the position shown in FIG. 1, they are firm and secure with respect to the rod 11 because of the piloting mentioned. Thus compressive forces applied between the two pieces will not cause them to buckle or otherwise move or distort since the pieces are firm and secure in the relationship mentioned thus far.

To provide for the adjustability of the two pieces in their overall extent, it will of course be understood that the inner piece 14 is telescopically slidable with respect to the outer sleeve 21, and thus it can be extended from the sleeve. A plate member 26 is disposed in the groove 19 of the spool 14 and extends into close relationship with the spool 14 as best shown in FIG. 2. Thus the plate 26 is of a size which projects over at least one-half of the axial projection of the rings 18 and thereby provides a large base for any compressive force on the member 14. It will of course also be understood that the end 27 of the sleeve 21 is adjacent the plate 26, and the latter also is of a size sufficient to project over more than one half of the axially proected area of the sleeve end 27. Therefore the compressive force exerted on the stop by means of retraction of the rod 11 toward the cylinder 10 will be transmitted between the pieces 14 and 21 through the member 26, and the latter will provide adequate support for transmitting the compressive force so that the two pieces will no tend to buckle.

It should now therefore be clearly understood that the piece 26 serves to secure the pieces 14 and 21 in their telescopic extension as set, and the piece 26 is removably connected to the sleeve 21 by means of the bolt 28 attached to the sleeve 21 by weldment W. Of course the piece 26 has an opening 29 which fits over the bolt 28, and wing nut 31 secures the piece 26 to the bolt. Thus the opening 29 is such that compressive forces axially of the pieces 14 and 21 will simply cause the plate 26 to slide into abutting engagement with the ring 18 and with the sleeve end 27 to be in the nature of a washer therebetween and directly transmit the compressive force between these two surfaces mentioned.

Still further, it will be seen that the sleeve 21 is longer than the spool 14, and thus when the latter is completely disposed within the sleeve 21, provision is made for removal of the spool 14 and such provision is the opening 32 on one end of the sleeve 21 and the opening 33 on the other end of the sleeve 21. These openings thus permit one to have access to or touch the spool 14 to slide it out of the sleeve to the desired extended position. Also the openings provide a means for having dirt or the like pass from the sleeve 21 since it must be understood that the hydraulic cylinder would be employed in conditions which are susceptible to receiving dirt and the like, and of course the dirt must be removed from the stop and the openings permit the passage of the dirt. Of course the sleeve 21 has its longitudinal cylindrical opening 34 which slidably receives the spool 14 in the snug manner mentioned.

While a specific embodiment of this invention has been shown and described, it should be obvious that certain changes could be made therein, and the invention should, therefore, be determined only by the scope of the appended claims.

What is claimed is:

1. An adjustable stop for use on a movable member to limit the extent of movement in one direction, comprising a movable member movable along its longitudinal axis, a first piece mounted on said member co-axial therewith and extending therealong in the direction of movement of said member, abutment means operative between said member and said first piece for limiting movement of said member in said one direction, a second piece telescopically snugly mounted on and carried by said first piece and being axially movable with respect thereto to be extendable therefrom in the direction of movement of said movable member and with said first piece being movable relative to said abutment means, a series of mating means selectively operatively connectable between said pieces for releasably securing said pieces in selected extended positions, releasable lock means connected to said mating means for securing the latter in selected connecting positions between said pieces, and means on each of said pieces slidably engaged with said movable member for piloting said pieces on said movable member.

2. An adjustable stop for use on a movable member to limit the extent of movement in one direction, comprising a movable member movable along its longitudinal axis and including an enlargement on one end thereof, an abutment disposed in the path of said member, a first piece co-axially mounted on said member and extending therealong in the direction of movement of said member, a second piece telescopically mounted on and carried by said first piece and being movable with respect to said first piece to be extendable therefrom in the direction of movement of said movable member, said pieces being disposed between and respectively abutable with and movable relative to said enlargement and said abutment, a series of mating means selectively operatively connectable between said pieces and extending therealong for releasably securing said pieces in selected positions extended in the direction of movement of said member, releasable lock means connected to said mating means for securing the latter in selected connecting positions between said pieces, and means on each of said pieces slidably engaged with said movable member for piloting said pieces on said movable member.

3. An adjustable stop for use on the ram of a hydraulic cylinder to limit the extent of retractable movement of the ram, comprising in combination a first piece mounted on said ram and extending therealong in the direction of movement thereof and having an interior opening extending through the length of said piece and being snugly slidably mounted on said ram, abutment means operative between said ram and said first piece for limiting relative movement of the later on said ram in one direction, a second piece telescopically mounted on and carried by said first piece and being movable with respect thereto to be extendable therefrom in the direction of movement of said ram and being snugly slidably piloted on said ram and with said first piece being movable relative to said abutment means, a series of mating means on said first piece and spaced along the length thereof, a member carried by said second piece and extending to said mating means and adapted to be set in selective positions with said mating means and to transmit compressive forces between said pieces, releasable lock means connected to said member for securing the latter on said second piece.

4. An adjustable stop for the rod of a hydraulic cylinder wherein there is an enlargement on the extending end of said rod, comprising the combination of an elongated spool having an elongated internal cylindrical opening for snug mounting on said rod and being slidable therealong into abutment with said hydraulic cylinder, said spool having a plurality of rings projecting exteriorly thereof and spaced along the length of said spool, a sleeve telescopically and slidably disposed over said spool and being snug on said rings and extending beyond said spool in one end and being abutable with said enlargement on said rod, said one end being snugly slidably piloted on said rod, a plate member disposed between said rings and extending into abutment with the other end of said sleeve for transmitting compressive forces between said spool and said sleeve, and means on said sleeve for releasably securing said plate member thereto for selective positioning of the latter with respect to said spool.

5. An adjustable stop for the rod of a hydraulic cylinder wherein there is an enlargement on the extending end of said rod, comprising the combination of a member having an elongated internal opening for mounting on said rod and being slidable therealong, said member having a plurality of exterior projections spaced therealong, a sleeve telescopically and slidably disposed over said member and being snug on said projections and extending beyond said member in one end and with said one end being snugly slidably piloted on said rod, the extending end of said member and said sleeve respectively being abutable with said cylinder and said enlargement for limited movement in both axial directions along said rod, a plate member disposed between said projections and extending into abutment with said sleeve for transmitting compressive forces between said member and said sleeve, and means on said sleeve for releasably securing said plate member thereto for selective positioning of the latter with respect to said member.

6. An adjustable stop for the rod of a hydraulic cylinder wherein there is an enlargement on the extending end of said rod, comprising the combination of an elongated spool having an internal cylindrical opening for snug mounting on said rod and being slidable therealong, said spool having a plurality of rings projecting exteriorly thereof and spaced along the length of said spool, a sleeve telescopically and slidably disposed over said spool and being snug on said rings and extending beyond said spool in one end, said one end being snugly slidably piloted on said rod, a plate member removably disposed between said rings and extending into abutment with the other end of said sleeve and being of a size sufficient to extend over more than one-half of the axially projected area of each of said rings and said other end of said sleeve for transmitting compressive forces between said spool and said sleeve, and means on said sleeve for releasably securing said plate member thereto for selective positioning of the latter with respect to said spool.

7. An adjustable stop for the rod of a hydraulic cylinder wherein there is an enlargement on the extending end of said rod, comprising the combination of an elongated spool having an internal cylindrical opening for snug mounting on said rod and being slidable therealong, said spool having a plurality of rings projecting exteriorly thereof and spaced along the length of said spool, a sleeve longer than said spool and telescopically and slidably disposed over said spool and being snug on said rings and extending beyond said spool in one end, said one end being snugly slidably piloted on said rod, said sleeve having an axially transverse opening therein extending to said spool for access to the latter, a plate member removably disposed between said rings and extending into abutment with the other end of said sleeve and being of a size sufficeint to extend over more than one-half of the axially projected area of each of said rings and said other end of said sleeve for transmitting compressive forces between said spool and said sleeve, and means on said sleeve for releasably securing said plate member thereto for selective positioning of the latter with respect to said spool.

References Cited by the Examiner
UNITED STATES PATENTS 2,804,944  9/57  Talbott _____ 188—67
2,850,307  9/58  Kindl _____ 287—58

ARTHUR L. LA POINT, *Primary Examiner.*

EUGENE G. BOTZ, *Examiner.*